United States Patent
Cardero et al.

(10) Patent No.: US 7,248,343 B2
(45) Date of Patent: Jul. 24, 2007

(54) AMPLITUDE-WEIGHTED SPATIAL COHERENT PROCESSING FOR LADAR SYSTEM

(75) Inventors: Silvio Antonio Cardero, Tucson, AZ (US); Robert Edmund Majewski, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 248 days.

(21) Appl. No.: 10/879,414

(22) Filed: Jun. 29, 2004

(65) Prior Publication Data

US 2007/0097352 A1    May 3, 2007

(51) Int. Cl.
  *G01C 3/08*    (2006.01)
(52) U.S. Cl. .................. 356/5.01; 356/5.02; 356/5.03; 356/5.1
(58) Field of Classification Search ................. 356/5.1, 356/5.01
  See application file for complete search history.

(56) References Cited

U.S. PATENT DOCUMENTS

| | | | |
|---|---|---|---|
| 4,298,280 A * | 11/1981 | Harney | 356/5.06 |
| 5,014,131 A * | 5/1991 | Reed et al. | 348/241 |
| 5,612,929 A * | 3/1997 | Lopes et al. | 367/107 |
| 5,847,678 A * | 12/1998 | Tachita | 342/357.03 |
| 6,246,827 B1 * | 6/2001 | Strolle et al. | 386/33 |
| 6,417,804 B1 * | 7/2002 | Merlet et al. | 342/368 |
| 6,559,932 B1 | 5/2003 | Halmos | 356/5.03 |
| 6,603,536 B1 | 8/2003 | Hasson et al. | 356/28.5 |
| 2003/0189512 A1 | 10/2003 | Chen et al. | 342/160 |

* cited by examiner

*Primary Examiner*—Thomas H. Tarcza
*Assistant Examiner*—Luke D. Ratcliffe
(74) *Attorney, Agent, or Firm*—Renner, Otto, Boisselle and Sklar, LLP

(57) ABSTRACT

A laser radar (LADAR) system is provided with amplitude-weighted spatial coherent processing. An amplitude-weighted sum of time domain signals arising from several detectors within a detector array is formed and used for range doppler processing. Weighting coefficients are chosen to be proportional to the signal amplitude present for each of the separate signals from each detector within the array. The amplitude coefficients are determined using target returned energy arising from a continuous wave (CW) porch portion of the transmitted waveform. Amplitude-weighted spatial coherent processing improves the carrier-to-noise ratio (CNR).

21 Claims, 4 Drawing Sheets

AMPLITUDE-WEIGHTED SPATIAL COHERENT PROCESSING FOR LADAR SYSTEM

GOVERNMENT INTERESTS

This invention was made with Government support under Contract DASG60-01-C-0035 awarded by the U.S. Army Space and Missile Defense Command. The Government has certain rights in the invention.

TECHNICAL FIELD

The present invention relates generally to laser radar (LADAR) systems, and more particularly to advanced discriminating LADAR systems.

BACKGROUND OF THE INVENTION

Advanced missile threats emerging in the 21st century require development of advanced laser radar (LADAR) sensing capabilities. The U.S. Army sponsored Discriminating Sensor Technology (DST) Program seeks to develop LADAR seeker technology to augment sensors of Exoatmospheric Kill Vehicle (ExoKV) seekers. Current ExoKV seekers can use three passive sensors (one visible and two infrared (IR)) for acquisition, tracking, limited discrimination, and aimpoint selection in the terminal homing phase. The visible sensor must rely on external illumination (sun, moon, stars, earthshine) and the IR sensors use emitted radiation to perform their tasks.

Advanced threats may include reentry vehicles (RVs) and identically shaped precision Lightweight Replica Decoys (LREPS) with RV-like motion as well as many Closely-Spaced Objects (CSOs) to degrade the discrimination performance of current non-imaging, passive ExoKV seekers. The increased traffic in future threat clusters, jammers, chaff, and radar-absorbing materials may degrade the acquisition and discrimination coordination between ground-based radars and passive ExoKV seekers. However, the presence of an DST Range-Resolved Doppler Imaging (RRDI) LADAR seeker onboard the ExoKV will substantially reduce coordination concerns.

The RRDI LADAR does not rely on external illumination or emitted radiation from the target. The RRDI LADAR illuminates each target to measure target range, velocity, and angular rates and form images that resolve the target in the range and cross-range (breadth) dimensions. The RRDI images substantially increase the number of target features measurable by the discrimination function of a LADAR-upgraded ExoKV seeker. The precision 4-dimensional (4-D) track of a RRDI LADAR seeker improves the quality of the guidance function, which reduces the amount of fuel needed to divert to the target. Each upgraded ExoKV passive sensor and the DST RRDI LADAR shares the same small telescope system.

DST uses a solid state laser transmitter to illuminate targets with coherent radiation. DST receiver optics collect and focus back-scattered Doppler-shifted radiation from the target onto a detector array where it is mixed (heterodyned) with a local oscillator signal derived from the transmitting laser. Heterodyning makes the signal detection process very sensitive to tiny, distant received signals and impervious to clutter noise sources. A modulated waveform is applied to the LADAR transmitted signal to permit the received signal to be processed to produce 4-D precision track (range, azimuth, elevation, and Doppler) measurements and RRDI images of each advanced target. These measurements locate the target and produce RRDI images that enhance in multiple ways the system discrimination function onboard an ExoKV.

Most RRDI images nominally have over ten range bins in the projected range dimension and many tens of Doppler bins in the crossrange dimension, even when targets are hundreds of kilometers from the LADAR seeker. These image changes yield features that permit advanced conical penetration aids to be discriminated on the basis of their body-centered motions that differ from that of an RV. Very sensitive Doppler measurement properties of the LADAR received signal magnify cross range measurement resolution by orders of magnitude beyond what is physically feasible by a passive seeker sharing the same aperture. These Doppler measurement properties of the RRDI LADAR map the relative velocities of tiny surface areas of RVs and decoys to extract motion feature differences that serve as discriminants.

The RRDI LADAR is not affected by radar jammers or chaff and can readily separate and discriminate objects that appear as CSOs to the ExoKV passive seeker. Adding an RRDI imaging seeker to an ExoKV improves CSO resolution, improves seeker discrimination quality against advanced replica decoy threats, increases lethality, reduces KV fuel and reduces missile defense system susceptibility to jammers and chaff.

Despite the advantages associated with the aforementioned advances in LADAR technology, and specifically RRDI LADAR, there remains room for significant improvements. For example, there exists an ongoing need for increased range acquisition. However, various applications such as missiles are not well-suited for the increased size and weight associated with higher power amplifiers used to improve range acquisition. In view of such disadvantages, there remains a strong need in the art for a LADAR system that provides improved performance without requiring increased size and weight.

SUMMARY OF THE INVENTION

According to the present invention, a LADAR system is provided with amplitude-weighted spatial coherent processing. As is described below in more detail, amplitude-weighted spatial coherent processing is used within the imaging LADAR system to improve the carrier-to-noise ratio (CNR). Since target imagery may lie across several detectors (e.g., pixels) of the detector array during operation of such a system, it is important to process the signals arising from several heterodyne array detectors in such a manner to maximize and maintain nearly constant the CNR of the resultant RRDI.

The present invention forms an amplitude-weighted sum of the time domain signals arising from several detectors within the detector array to form a resultant time domain signal used for range doppler processing. According to the exemplary embodiment, the weighting coefficients are chosen to be proportional to the signal amplitude present for each of the separate signals from each detector within the array. The amplitude coefficients are determined using target returned energy arising from a continuous wave (CW) porch portion of the transmitted waveform. The returned signals are integrated in order to obtain estimates of the signal amplitudes. The amplitude coefficients derived in this manner are then used in forming the final amplitude-weighted coherent signal.

In accordance with one particular aspect of the present invention, a laser radar (LADAR) system for sensing a target includes a laser for illuminating the target with a target signal waveform, which includes a porch waveform followed by an imaging waveform. A heterodyne detector array, which includes an M×N array of detectors, detects the target signal waveform reflected back from the target, with each of the detectors producing a respective time domain signal for use in range doppler processing to sense the target. Amplitude weighting processing circuitry calculates a set of amplitude weighting coefficients, which are proportional to the time domain signal amplitude for each of the detectors. Range doppler processing circuitry forms a summation of the respective time domain signals using the amplitude weighting coefficients, and processes the summation to develop an output representing the target.

In accordance with another particular aspect of the invention, a laser radar (LADAR) method for sensing a target includes illuminating the target with a target signal waveform, which includes a porch waveform followed by an imaging waveform. A target signal waveform reflected back from the target is detected using a heterodyne detector array, where each of the detectors produces a respective time domain signal. A plurality of amplitude weighting coefficients, which are proportional to the time domain signal amplitude for each of the detectors, are calculated. The respective time domain signals are weighted using the amplitude weighting coefficients. The amplitude-weighted time domain signals are summed and processed to develop an output representing the target.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
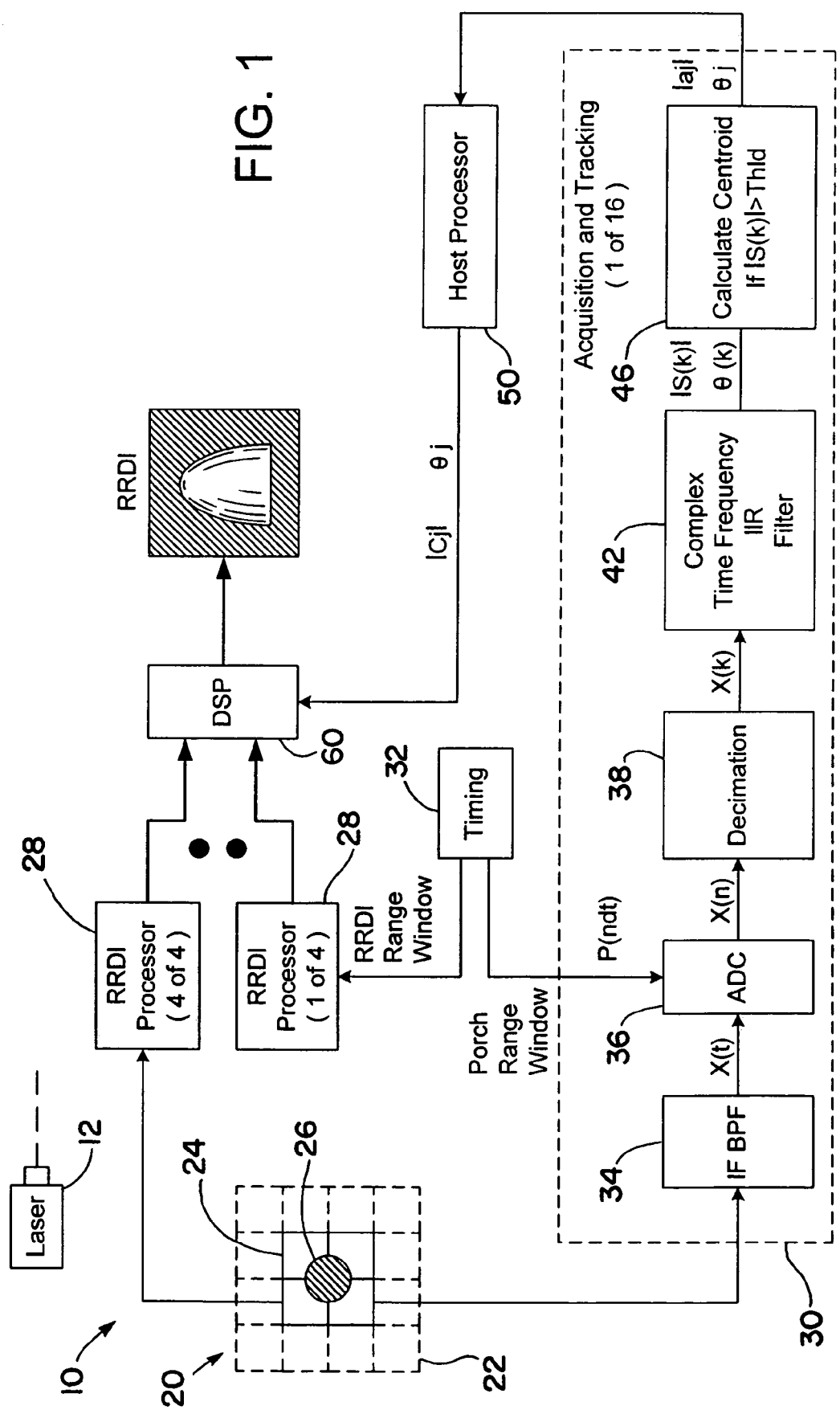
FIG. 1 is a block diagram of an RRDI LADAR system in accordance with an exemplary embodiment of the present invention.

The present invention will now be described with reference to the drawings, wherein like reference numerals are used to refer to like elements throughout.

One aspect of the invention includes amplitude-weighted spatial coherent processing. As is described below in more detail, amplitude-weighted spatial coherent processing is used within an imaging laser radar (LADAR) system to improve the carrier-to-noise ratio (CNR). The use of amplitude-weighted spatial coherent processing avoids or at least minimizes summing noise from array detectors that are not detecting a target returned signal. The methodology described herein maximizes and maintains nearly constant the composite heterodyne efficiency (HE) of the heterodyne detector array and, therefore, the CNR of the resultant amplitude-weighted coherent signal used to form the RRDI image.

Figure 2:
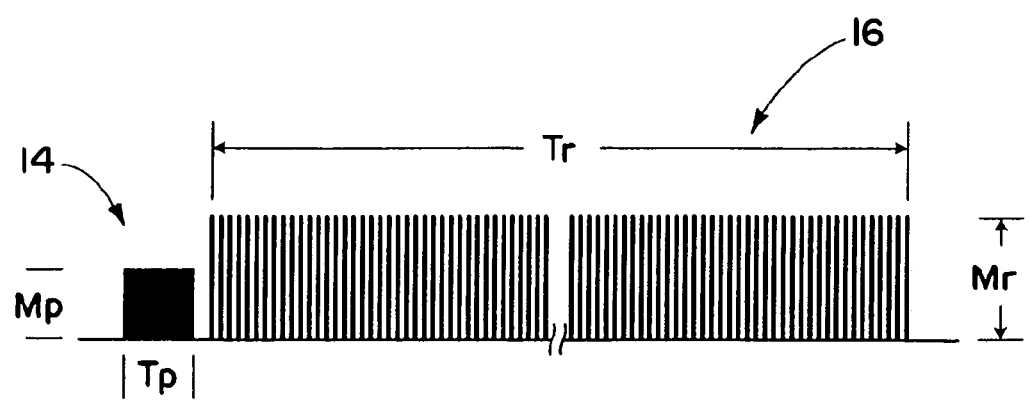
FIG. 2 is a signal waveform representing a transmit signal of the LADAR system in accordance with the exemplary embodiment of the present invention.

Referring initially to FIG. 1, an RRDI LADAR system 10 is shown in accordance with an exemplary embodiment of the present invention. As in conventional LADAR systems, the system 10 includes a laser 12 that serves to illuminate a target (or targets) periodically with a target signal waveform. As is illustrated in FIG. 2, the target signal waveform in the exemplary embodiment is made up of a continuous wave (CW) porch waveform 14 followed by an RRDI imaging waveform 16. The porch waveform 14 has a known amplitude Mp and duration Tp. Similarly, the RRDI imaging waveform 16 has a known amplitude Mr and duration Tr. The laser 12 is configured to transmit the target signal waveform periodically towards a target such that the reflected target signal waveforms may be received and processed in order to form a LADAR image of the target. As described below in more detail, the porch signal 14 is a multi-use signal, which can be used in connection with range and velocity estimation.

Again referring to FIG. 1, the system 10 further includes a system receiver 20 for receiving and processing the target signal waveforms reflected back from the target. In the exemplary embodiment, the receiver 20 includes a heterodyne detector array 22 onto which the reflected target signal waveforms are imaged. The detector array 22 is made up of an M by N array of photodetectors (also referred to herein as pixels or simply as detectors). In the present example, the detector array 22 is a four-by-four array, although it will be appreciated that the present invention is not limited in any way to a particular size array.

In the exemplary embodiment, the four-by-four detector array includes a two-by-two central quadrant portion 24. The system 10 can include a tracking system that attempts to maintain the reflected target signal echo spot 26 centered within the two-by-two central quadrant portion 24 (as shown in FIG. 1). In the exemplary embodiment, the heterodyne detector array 22 receives or otherwise detects the reflected target signal along with a local oscillator light signal (e.g., produced by a local oscillator laser that illuminates the entire detector array with light of a predetermined frequency) to down-convert the target signal frequency to a frequency that can be processed by electronics (this is often referred to as optical mixing or optical heterodyning).

The power from the reflected target signal (also referred to as the echo signal or echo) can form a spot on the detector array 22, typically spanning several detectors (4 detectors in the exemplary embodiment). Once the echo signal impinges on the detector array, the system 10 can begin operating in a tracking mode during which the tracking system attempts to maintain the reflected target signal echo spot centered within the two-by-two quadrant central array 24.

As represented in FIG. 1, each detector within the detector array 22 is connected to an RRDI processor channel 28 and a corresponding tracking processor channel 30 (also referred to herein as a tracking board). For example, in the exemplary embodiment in which the detector array includes sixteen detectors, the system 10 can include sixteen RRDI processors 28 and sixteen tracking boards 30, each of which performs the signal processing described more fully below. In an alternative embodiment, only a portion of the detectors within the detector array are connected to respective RRDI processor channels. Since, by way of example, this discussion is concerned with the 2×2 central quadrant array, only 4 RRDI processors 28 and 4 tracking boards 30 will be discussed herein. As is described in more detail below, each tracking board 30 can also include much of the circuitry used for calculating the weighting coefficients. A timing board 32 or other suitable gating device is designed to open two separate range gate windows to capture the porch signal for target tracking (and amplitude-weighting coefficient calculation) and the RRDI signal for target classification.

Figure 3:
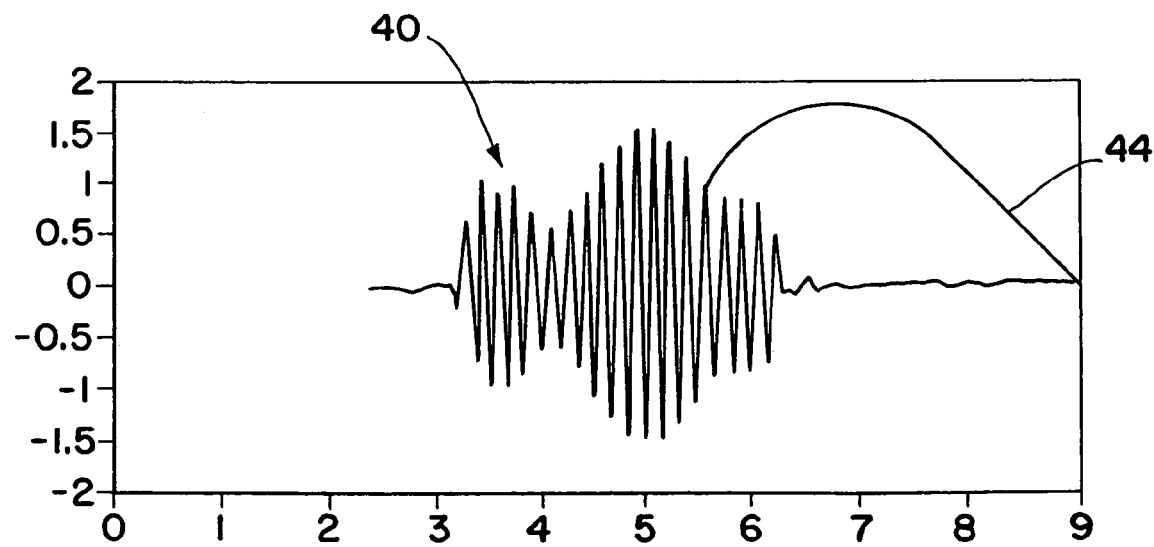
FIG. 3 is a signal waveform representing a return porch waveform portion of the transmit signal in accordance with the exemplary embodiment of the present invention.

In one embodiment, the AM modulated returned porch signal (also referred to as a tracking signal) passes through an intermediate frequency (IF) bandpass filter 34 in the tracking board 30 to band limit the additive local oscillator noise of the return signal. The filtered time domain porch signal X(t) is shown and indicated as 40 in FIG. 3. The filtered time domain porch signal 40 consists of a carrier pulse at the IF frequency with a modulation envelope induced with the Doppler and Speckle of the rotating target.

In the exemplary embodiment, the band-limited porch signal X(t) is sampled by an analog-to-digital (A/D) converter 36 (in accordance with a timing signal P(ndt) from the timing board 32). The A/D converted signal X(n) is passed through a decimation filter 38, which decimates the A/D converted signal X(n) in samples according to the narrow band of the IF bandpass filter 34. The decimated signal X(k) is applied to a complex narrow bandpass infinite impulse response (IIR) filter 42, which generates a complex base band signal S(k), θ(k) (which waveform is illustrated and indicated as 44 in FIG. 3).

A threshold is applied to the magnitude response of the complex base band signal S(k) and the centroid of S(k) is calculated using an appropriate processor 46. The result of this calculation is a coefficient including the magnitude $a_j$ and phase $\theta_j$ of the centroid of S(k) (illustrated in FIG. 3). It is to be appreciated that this coefficient $a_j$ (also referred to herein as an amplitude coefficient) is proportional to the amount of optical power falling on the individual detector, where the phase $\theta_j$ represents the sign of that coefficient. While not used for computation of the weighting coefficients, it will be appreciated that the centroid of S(k) will correspond to the falling edge of the porch signal and can be used for purposes of gating.

For each tracking channel 30, the coefficients $a_j$ and $\theta_j$ (where j is the detector channel designation) will be transmitted to a host processor 50. In the exemplary embodiment, coefficients from each of the four tracking channels corresponding to each of the 4 detectors within the 2×2 center quadrant array will be transmitted to the host processor 50.

Each time an echo is received by the detector array 22, the host processor 50 collects the $a_j$ and $\theta_j$ coefficients from each tracking channel and computes coefficients $c_j$, where the coefficients $c_j$ are the amplitude-weighted versions of $a_j$. As is described mathematically below, the magnitude of the weighting coefficients is proportional to the square root of the signal power from each of the four detectors within the 2×2 central quadrant array.

In one embodiment, the amplitude-weighted coefficients $c_j$ are complex (i.e., signed numbers) in order to take into account aberrations in optics that may skew the arrival of the target returned signal at each detector. Alternatively, magnitude alone can be employed without departing from the scope of the present invention. In one embodiment, the signs of the coefficients will be adjusted in order to line up the phasors that represent the 4 separate signals. Such a phase adjustment could be employed because signals arising from the first optical sidelobe are 180 degrees out of phase with respect to signals arising from the mainlobe. In the exemplary embodiment, the weighting coefficients are held constant during a single coherent data collection interval, but will be updated for separate coherent intervals that are used for post detection integration (PDI).

The amplitude-weighted coefficients $c_j$ are passed on to an appropriate digital signal processor (DSP) 60. The DSP multiplies each RRDI time domain signal from a given RRDI processor 28 by the corresponding amplitude-weighted coefficient $c_j$, thereby providing a plurality of amplitude-weighted RRDI time domain signals. The amplitude-weighted RRDI time domain signals are summed and further processed to provide a target image. This processing can include storing the RRDI waveform rows in a serial memory buffer (e.g., 64 samples per row). A fast Fourier Transform (FFT) operation can be performed across the rows and the magnitude of the FFT can be used to provide the target image. This image processing is relatively well-known and, therefore, will not be discussed in great detail.

Figure 4:
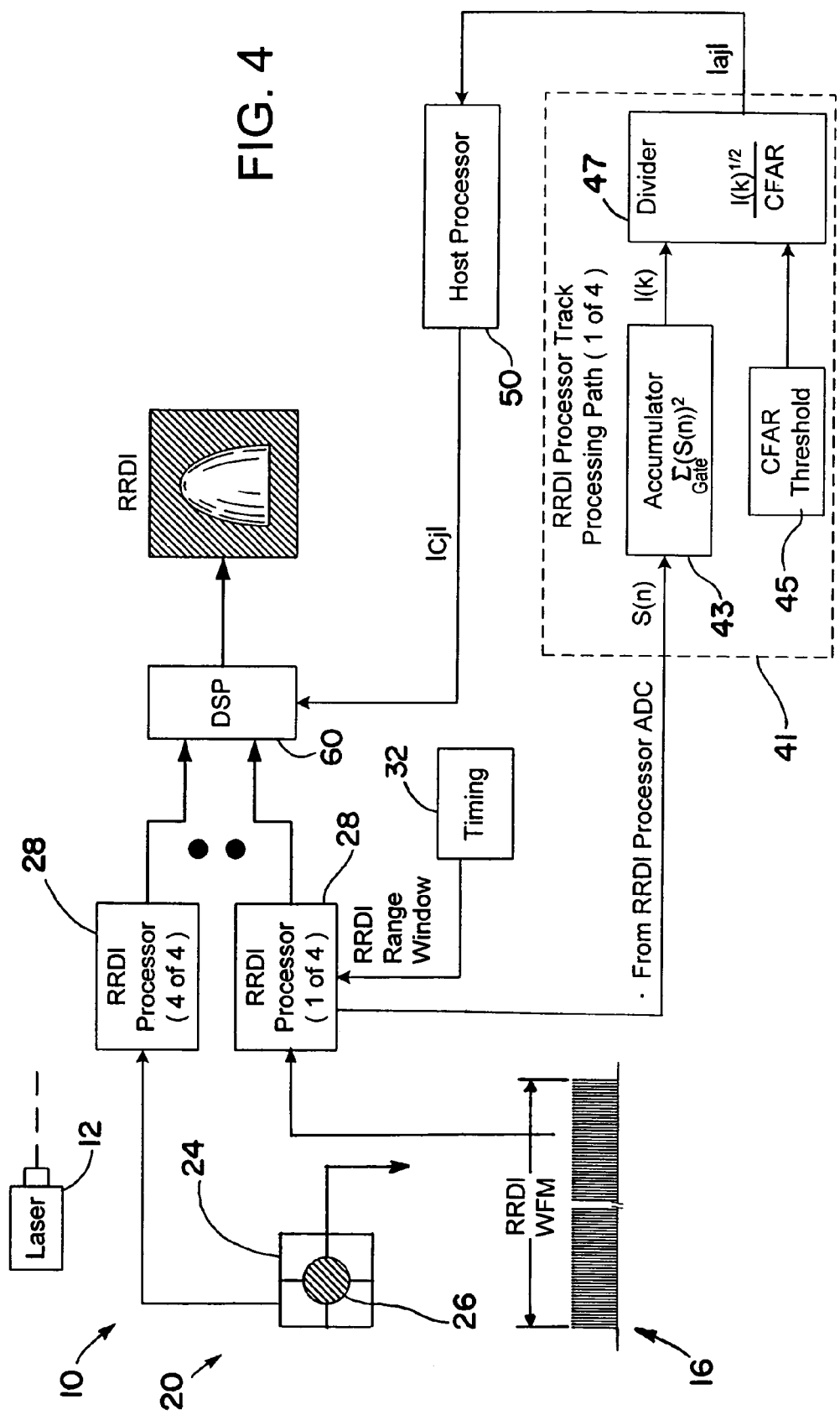
FIG. 4 is a block diagram of an RRDI LADAR system in accordance with another exemplary embodiment of the present invention.

With reference now to FIG. 4, wherein like elements are referred to using like reference numerals, an RRDI LADAR system 10 is shown in accordance with another exemplary embodiment of the present invention. As is described below in more detail, in this exemplary embodiment, the amplitude-weighted spatial coherent processing is employed using amplitude coefficients $a_j$ that are determined based on or otherwise extracted from the RRDI waveform, rather than the porch waveform (of course, the porch waveform may still be used for tracking purposes, as is described above).

As is described above, the system 10 includes a laser 12 that serves to illuminate a target (or targets) periodically with a target signal waveform. In the exemplary embodiment, the system includes a receiver 20, such as a heterodyne detector array 22, for receiving and processing the target signal waveforms reflected back from the target. As described above, the detector array 22 is made up of an M by N array of photodetectors. While the detector array 22 can be of any suitable size, the present discussion will focus on a two-by-two central quadrant portion 24 of the detector array. As discussed above, the system 10 can include a tracking system that attempts to maintain the reflected target signal echo spot 26 centered within the two-by-two central quadrant portion 24.

Each detector within the detector array 22 is connected to an RRDI processor channel 28 (and, optionally, a corresponding tracking processing channel or tracking board). In an alternative embodiment, only a portion of the detectors within the detector array are connected to respective RRDI processor channels. As discussed above with reference to FIG. 1, a timing board 32 or other suitable gating device is designed to open one or more separate range gate windows (e.g., to capture a porch signal for target tracking and the RRDI signal for amplitude-weighting coefficient calculation and target classification). In one embodiment, the target returned RRDI signal from each RRDI processor 28 can be appropriately filtered (e.g., using a bandpass filter) and analog-to-digital (A/D) converted. The A/D converted signal S(n) is passed on to an RRDI processor track channel 41. It is to be appreciated that the system 10 can include an RRDI processor track channel 41 for each RRDI processor 28. In the illustrated embodiment, the RRDI processor track channel 41 includes an accumulator 43, which integrates the return signal amplitude squared over the range gate window for each detector. As represented in FIG. 4, the accumulator 43 outputs a signal I(k) that is representative of the target return signal amplitude squared integrated over the range gate window. As is described in more detail below, $$I(k) = \left( \sum_{\text{Gate}} S_j(k)^2 \right).$$

The integrated target returned signal amplitude squared, I(k), along with a constant false alarm rate (CFAR) threshold 45, is passed along to a divider circuit 47, where the square-root of I(k) is divided by the CFAR threshold of the respective channel. It is to be appreciated that this is equivalent to flat fielding the detectors or pixels. The CFAR threshold is derived by measuring the number of threshold crossings when there is no target signal and local oscillator (LO) noise is the only signal source. This threshold constant is proportional to that detector's receiver channel gain. The divider circuit 47 then outputs an amplitude coefficient $a_j$, which is equivalent to the amplitude estimate of the echo spot power falling on a given detector or pixel (e.g., the jth detector or pixel).

As described above with respect to FIG. 1, each amplitude coefficient $a_j$ is transmitted to a host processor 50. In the exemplary embodiment, coefficients from each of the four RRDI processor track channels 41 corresponding to each of the four detectors within the 2×2 center quadrant array are transmitted to the host processor 50. Each time an echo is received by the detector array 22, the host processor collects the $a_j$ coefficients from each RRDI processor track channel 41 and computes coefficients $c_j$, where the coefficients $c_j$ are the amplitude-weighted versions of the amplitude coefficients $a_j$. One advantage of calculating amplitude coefficients $a_j$ from the RRDI waveform is that the RRDI waveform contains more energy than the porch waveform, which may produce a better amplitude-weighted coefficient estimate. As is described mathematically below in equation 1, each amplitude coefficient $a_j$ is proportional to the square root of the signal power from each of the four detectors within the 2×2 central quadrant array.

$$a_j = \frac{\left( \sum_{\text{Gate}} S_j(k)^2 \right)^{1/2}}{CFAR_j}, \quad (1)$$

where $CFAR_j$ is the constant false alarm rate threshold of the jth detector and $S_j(k)$ is the return signal amplitude received by the jth detector.

As described above with respect to FIG. 1, the amplitude-weighted coefficients $c_j$ are passed on to an appropriate digital signal processor (DSP) 60. The DSP 60 multiplies each RRDI time domain signal from a given RRDI processor 28 by the corresponding amplitude-weighted coefficient $c_j$, thereby providing a plurality of amplitude-weighted time domain signals, which can be summed and further processed to provide a target image.

The use of amplitude-weighted spatial coherent processing avoids or at least minimizes summing noise from array detectors that are not detecting the echo spot. This serves to maximize signal-to-noise ratio by not summing noise from blank spots. For example, consider a situation where an unresolved point target image is positioned at the center of an array of 4 detectors (2×2 array) and each detector results in a carrier-to-noise ratio (CNR) of C. If "power" RRDI images from four detectors are added in an incoherent manner, the overall CNR will also be C. In the incoherent spatial signal processing approach, noise power of the separate detectors adds and the signal power will also add, resulting in the same CNR as each of the individual detectors. If the outputs of the four detectors are added coherently, the noise power adds, but the signal power increases by a factor of 16. Therefore, the resultant CNR is 4C—a factor of 4 greater than that of a single detector. Amplitude weighting the detectors is valuable for maintaining a high, nearly constant CNR as a function of target image position within the 4-detector array. A low CNR would result for the case where a target image falls on the center of a single detector, if the detector signals were added with equal weights. Adding signals from array detectors having small signal power contributes more noise power than signal power, thus reducing the overall CNR.

Figure 5:
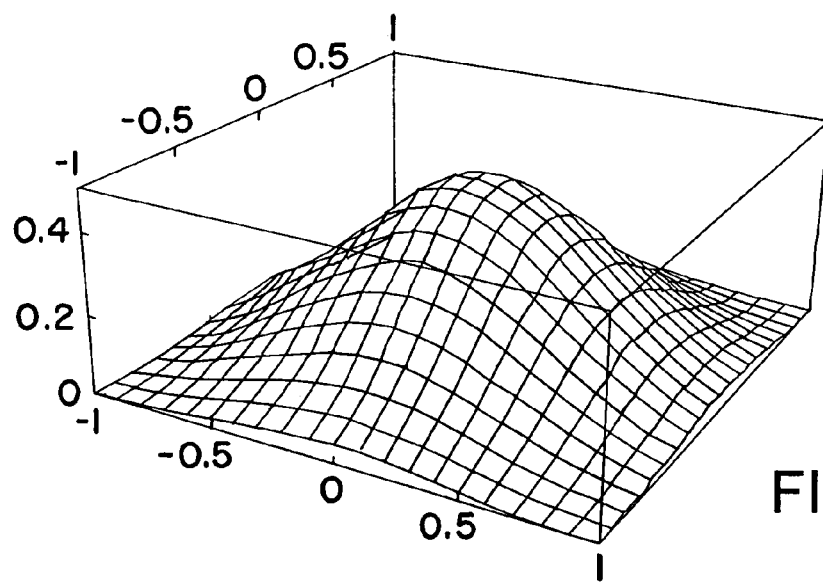
FIG. 5 is a graph illustrating the effective heterodyne mixing efficiency as a function of position for a 2×2 center quadrant of a detector array using coherent processing with equal weights.

Equal weighted coherent processing can produce a relatively high CNR in the center of a 2×2 region, however, the performance falls off as the target moves away from the center of the 2×2 region. This is illustrated in FIG. 5, which is a plot of the effective heterodyne mixing efficiency (which is proportional to the resultant CNR) as a function of position for an exemplary 2×2 detector region.

Figure 6:
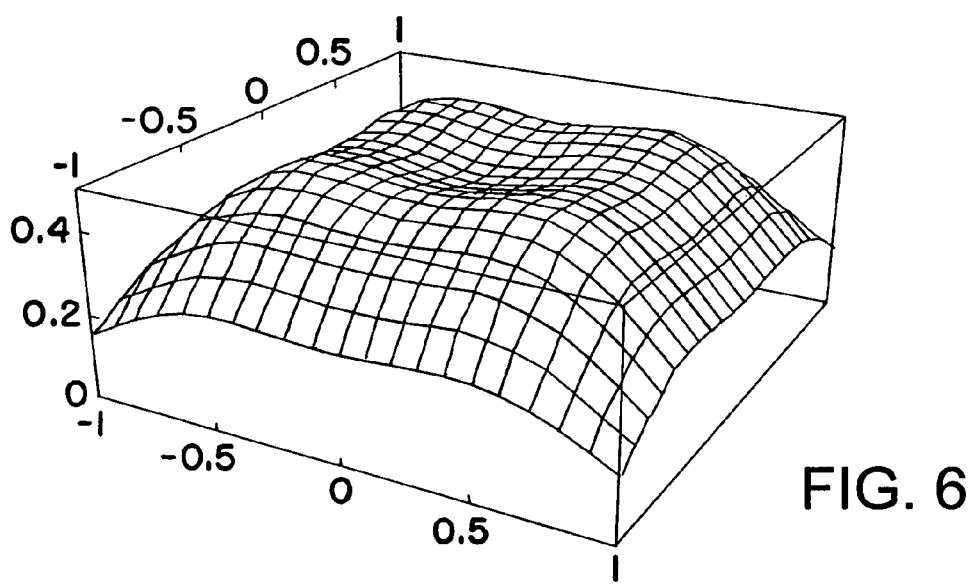
FIG. 6 is a graph illustrating the effective heterodyne mixing efficiency as a function of position for a 2×2 center quadrant of a detector array using coherent processing with amplitude weighting in accordance with the exemplary embodiment of the present invention.
Figure 7:
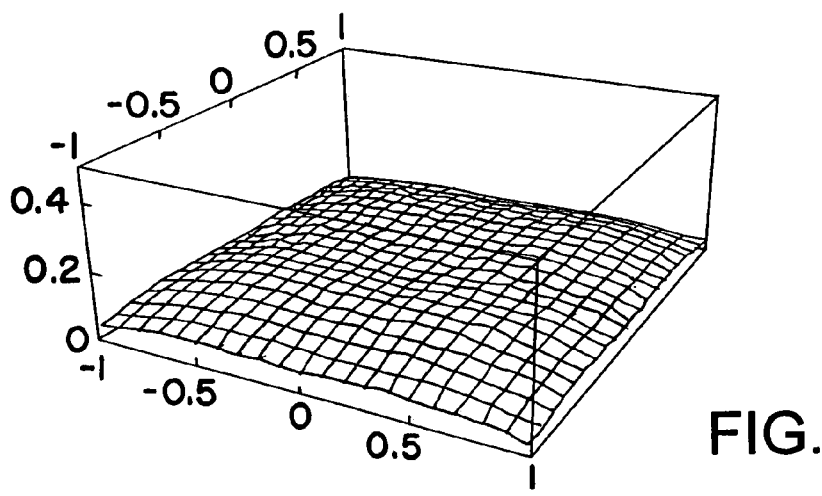
FIG. 7 is a graph illustrating the effective heterodyne mixing efficiency as a function of position for a 2×2 center quadrant of a detector array using incoherent processing with equal weights.

The performance is improved significantly by summing the detector signals with properly adjusted weights, as is discussed herein. This improved performance is illustrated in FIG. 6, which is a plot of the effective heterodyne mixing efficiency as a function of position for an exemplary 2×2 detector region. FIG. 7 shows the effective heterodyne mixing efficiency for incoherent spatial processing (plotted to the same scale as FIG. 5 and FIG. 6).

The following is a mathematical derivation of the amplitude weighting methodology described above in connection with the exemplary system illustrated in FIG. 1. A signal from the jth detector can be considered as $$S_j(t) = a_j \cos(\omega t) + n_j(t) \quad (2),$$

where $a_j$ is the amplitude of the sinusoidal signal and $n_j(t)$ is a noise term for the jth detector. For purposes of this discussion, the noise properties are assumed to be the following.

$$\langle n_j(t) \rangle = 0$$

$$\langle n_j(t) n_k(t) \rangle = 0$$

$$\langle n_j^2(t) \rangle = \delta_0^2 \quad (3),$$

where $\langle n_j(t) n_k(t) \rangle$ represents an ensemble average of the noise signal from detector j with detector k. For example, if $j \neq k$, $\langle n_j(t) n_k(t) \rangle = 0$ implies a lack of correlation of the noise signals. The desired signal to be generated P(t) is a linear combination of the signals from separate detectors, where $c_j$ is a weighting coefficient.

$$P(t) = \sum_j c_j S_j(t). \tag{4}$$

The noise alone contribution to the power is $$\langle P_n^2(t) \rangle = \delta_0^2 \sum_k c_k^2. \tag{5}$$

The signal power alone contribution is $$\langle P_s^2(t) \rangle = \frac{1}{2} \sum_{j,k} c_j c_k a_j a_k. \tag{6}$$

In order to maximize the carrier-to-noise ratio (CNR) it is desired to maximize the signal power subject to the constraint that the total noise alone power remains constant. This may be accomplished using the method of Lagrange undetermined multipliers. The noise power constraint is $$\sum_j c_j^2 = c_0^2. \tag{7}$$

The constrained maximum can be determined by solving $$\frac{\partial}{\partial c_l} \left[ \frac{1}{2} \sum_{j,k} c_j c_k a_j a_k - \lambda \sum_j c_j^2 \right] = 0, \tag{8}$$

where $\lambda$ is the undetermined multiplier. The solution is $$c_j = a_j \frac{c_0}{\sqrt{\sum_k a_k^2}}. \tag{9}$$

Thus, the weighting coefficients are proportional to the signal amplitudes. In general, these amplitudes are signed quantities. As discussed above, unsigned magnitudes can be used as well.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A laser radar (LADAR) system for sensing a target, comprising:

a laser for illuminating the target with a target signal waveform;

a heterodyne detector array comprising an M×N array of detectors for detecting the target signal waveform reflected back from the target, each of the detectors producing a respective time domain signal for use in range doppler processing to sense the target;

amplitude weighting processing circuitry that calculates a set of amplitude weighting coefficients, the amplitude weighting coefficients being proportional to the time domain signal amplitude for each of the detectors, wherein the amplitude weighting processing circuitry comprises:

circuitry that calculates the amplitude of an imaging portion of the respective time domain signals; and a host processor which calculates amplitude-weighted coefficients based on the calculated amplitudes of the imaging portion of each of the respective time domain signals; and range doppler processing circuitry for forming a summation of the respective time domain signals using the amplitude weighting coefficients, and processing the summation to develop an output representing the target;

wherein the circuitry that calculates the amplitude of the imaging portion of the respective time domain signals comprises:

an analog-to-digital (A/D) converter which converts the time domain signal into a digital signal;

an accumulator which sums the square of the imaging portion of each time domain signal; and a divider circuit which divides the square-root of the square of the imaging portion of each time domain signal by a constant false alarm rate (CFAR) threshold.

2. A laser radar (LADAR) system for sensing a target, comprising:

a laser for illuminating the target with a target signal waveform;

a heterodyne detector array comprising an M×N array of detectors for detecting the target signal waveform reflected back from the target, each of the detectors producing a respective time domain signal for use in range doppler processing to sense the target;

amplitude weighting processing circuitry for calculating a set of amplitude weighting coefficients, the amplitude weighting coefficients being proportional to the time domain signal amplitude for each of the detectors; and range doppler processing circuitry for forming a summation of the respective time domain signals using the amplitude weighting coefficients, and processing the summation to develop an output representing the target, wherein the target signal waveform includes a porch portion followed by an imaging portion, and the amplitude weighting processing circuitry comprises:

circuitry for calculating the amplitude of the porch portion of the respective time domain signals; and a host processor which calculates amplitude-weighted coefficients based on the calculated amplitudes of the porch portion of each of the respective time domain signals.

3. The LADAR system according to claim 2, wherein the circuitry for calculating the amplitude of the porch portion of the respective time domain signals comprises:

a bandpass filter which receives and filters the time domain signal;

an analog-to-digital (A/D) converter which converts the bandpass filtered time domain signal into a digital signal;

a decimation filter which decimates the A/D converted signal in samples according to the band of the bandpass filter;

a complex time frequency infinite impulse response (IIR) filter which filters the decimated signal; and a processor which calculates the magnitude and phase of the centroid corresponding to the IIR filtered signal.

4. The LADAR system according to claim 2, wherein the amplitude weighting coefficients each have a magnitude proportional to the square root of the signal power from each of the detectors.

5. The LADAR system according to claim 2, wherein the range doppler processing circuitry comprises:

a processor which multiplies each time domain signal by the respective amplitude weighting coefficient and sums the amplitude-weighted time domain signals.

6. The LADAR system according to claim 2, wherein the amplitude weighting coefficients are complex coefficients.

7. The LADAR system according to claim 2, wherein the range doppler processing circuitry forms a summation of the respective time domain signals using the amplitude weighting coefficients coherently.

8. The LADAR system according to claim 2, wherein M=N=4.

9. The LADAR system according to claim 8, wherein the detector array includes a 2×2 central quadrant detector array.

10. The LADAR system according to claim 9, wherein each detector within the 2×2 central quadrant detector array is in data communication with a range doppler processor channel.

11. The LADAR system according to claim 10, wherein each range doppler processor channel is in data communication with the range doppler processing circuitry.

12. The LADAR system according to claim 10, wherein each detector within the 2×2 center quadrant detector array is in data communication with a separate amplitude weighting processing circuit channel.

13. The LADAR system according to claim 12, further comprising:

gating circuitry in data communication with the amplitude weighting processing circuit channel and each range doppler processor channel, and wherein the gating circuitry opens separate range gate windows to capture the porch signal and the imaging signal.

14. A laser radar (LADAR) method for sensing a target, the method comprising:

illuminating the target with a target signal waveform;

detecting the target signal waveform reflected back from the target using a heterodyne detector array, each of the detectors producing a respective time domain signal;

calculating a plurality of amplitude weighting coefficients, the amplitude weighting coefficients being proportional to the time domain signal amplitude for each of the detectors, wherein calculating a plurality of amplitude weighting coefficients includes selectively receiving an imaging portion of the respective time domain signals and calculating the amplitude of the imaging portion of the respective time domain signals;

weighting the respective time domain signals using the amplitude weighting coefficients; and summing the amplitude-weighted time domain signals and processing the summation to develop an output representing the target;

wherein calculating the amplitude of the imaging portion of the respective time domain signals includes:

analog-to-digital (A/D) converting at least a portion of the time domain signals into digital signals;

applying an accumulator to the A/D converted signals to integrate the A/D converted signal amplitude squared; and dividing the square-root of the A/D converted signal amplitude squared by a constant false alarm rate threshold (CFAR).

15. A laser radar (LADAR) method for sensing a target, the method comprising:

illuminating the target with a target signal waveform;

detecting the target signal waveform reflected back from the target using a heterodyne detector array, each of the detectors producing a respective time domain signal;

calculating a plurality of amplitude weighting coefficients, the amplitude weighting coefficients being proportional to the time domain signal amplitude for each of the detectors;

weighting the respective time domain signals using the amplitude weighting coefficients; and summing the amplitude-weighted time domain signals and processing the summation to develop an output representing the target, wherein calculating a plurality of amplitude weighting coefficients includes:

selectively receiving the porch portion of the respective time domain signals; and calculating the amplitude of the porch portion of the respective time domain signals.

16. The method according to claim 15, wherein the amplitude weighting coefficients are calculated based on the respective amplitudes of the porch portions of the time domain signals.

17. The method according to claim 15, wherein calculating the amplitude of the porch portion of the respective time domain signals includes:

bandpass filtering time domain signals;

analog-to-digital (A/D) converting the bandpass filtered time domain signals into a digital signals;

decimating the A/D converted signal in samples according to the bandpass filtering band;

applying a complex time frequency infinite impulse response (IIR) filter to the decimated signals; and calculating the magnitude and phase of the centroid corresponding to the IIR filtered signal.

18. The method according to claim 14, wherein the amplitude weighting coefficients are calculated based on the respective amplitudes of the imaging portions of the time domain signals.

19. The method according to claim 15, wherein weighting the respective time domain signals includes multiplying each time domain signal by its corresponding amplitude weighting coefficient.

20. The method according to claim 15, wherein the weighting coefficients are held constant during a single coherent time domain signal data collection interval.

21. The method according to claim 15, wherein the summing and processing steps are performed coherently.

* * * * *